US00RE47515E

(19) United States
(12) Reissued Patent
Westerhof et al.

(10) Patent Number: US RE47,515 E
(45) Date of Reissued Patent: *Jul. 16, 2019

(54) ROTARY SHAVER WITH IMPROVED SUPPORT STRUCTURE FOR SHAVING HEADS

(71) Applicant: KONINKLIJKE PHILIPS N.V., Eindhoven (NL)

(72) Inventors: Wilko Westerhof, Drachten (NL); Mattheus Jacobus Van Der Meer, Eindhoven (NL); Albert Jan Aitink, Eindhoven (NL); Harold Wolf, Eindhoven (NL); Oege Smedinga, Eindhoven (NL)

(73) Assignee: KONINKLIJKE PHILIPS N.V., Eindhoven (NL)

( * ) Notice: This patent is subject to a terminal disclaimer.

(21) Appl. No.: 14/664,083

(22) Filed: Mar. 20, 2015

Related U.S. Patent Documents

Reissue of:
(64) Patent No.: 8,261,452
Issued: Sep. 11, 2012
Appl. No.: 12/514,459
PCT Filed: Nov. 12, 2007
PCT No.: PCT/IB2007/054579
§ 371 (c)(1),
(2) Date: Nov. 17, 2009
PCT Pub. No.: WO2008/062339
PCT Pub. Date: May 29, 2008

U.S. Applications:
(63) Continuation of application No. 14/484,033, filed on Sep. 11, 2014, which is an application for the reissue of Pat. No. 8,261,452.

(30) Foreign Application Priority Data

Nov. 20, 2006 (EP) ..... 06124399

(51) Int. Cl.
*B26B 19/38* (2006.01)
*B26B 19/14* (2006.01)

(52) U.S. Cl.
CPC ..... *B26B 19/14* (2013.01); *B26B 19/145* (2013.01); *B26B 19/386* (2013.01); *B26B 19/3853* (2013.01)

(58) Field of Classification Search
CPC ..... B26B 19/14; B26B 16/386
See application file for complete search history.

(56) References Cited

U.S. PATENT DOCUMENTS 2,253,037 A 8/1941 Knapp
2,253,737 A 8/1941 Testi
(Continued)

FOREIGN PATENT DOCUMENTS

DE 1004518 B 9/1955
DE 1004518 3/1957
(Continued)

OTHER PUBLICATIONS

European Patent Office, European Proceedings, Apr. 20, 2015, pp. 1-599, European Patent Office, Munich, Germany.
(Continued)

*Primary Examiner* — Jeffrey L Gellner

(57) ABSTRACT

A shaving device comprises a head structure (2) and a base structure (4). The head structure (2) is configured to retain and support at least one shaving head (30A, 30B, 30C). The head structure (2) is releasably retainable on the base structure (4). The base structure (4) is free of support elements in an area of an outer circumference of the head structure (2) such that the head structure (2), when coupled to the base structure (4), is not supported in the area of its outer circumference. The head structure (2), when coupled to the base structure (4), is substantially only retained on the base structure (4) by a retaining force provided by a retaining
(Continued)

structure of the base structure (4). When an overloading force is exerted on the head structure (2), the force is transferred to a coupling element (8) arranged in a central area (2A) of the head structure (2) such that the coupling element (8) is released from the retaining structure of the base structure (4) in order to prevent damage to the head structure (2).

8 Claims, 8 Drawing Sheets

(56) References Cited

U.S. PATENT DOCUMENTS

| | | | | |
|---|---|---|---|---|
| 2,878,499 | A | 3/1959 | Pressman | |
| 3,363,312 | A | 1/1968 | Fayed | |
| 3,913,225 | A * | 10/1975 | Tietjens et al. | 30/43.6 |
| 4,077,120 | A | 3/1978 | Herrick et al. | |
| 4,168,570 | A | 9/1979 | Bakker et al. | |
| 4,688,329 | A | 8/1987 | Oord et al. | |
| 4,733,466 | A | 3/1988 | Fletcher, Jr. et al. | |
| 5,007,168 | A * | 4/1991 | Messinger et al. | 30/43 |
| 5,606,799 | A * | 3/1997 | Melton | 30/216 |
| 5,822,869 | A | 10/1998 | Metcalf et al. | |
| 5,867,908 | A | 2/1999 | Van Veen et al. | |
| 7,222,428 | B2 * | 5/2007 | Koike | 30/43.5 |
| 7,370,420 | B2 * | 5/2008 | Shimizu | 30/43.4 |
| 7,930,828 | B2 * | 4/2011 | Brada et al. | 30/43.4 |
| 2010/0011589 | A1 * | 1/2010 | Van Der Borst et al. | 30/43.4 |
| 2010/0058594 | A1 * | 3/2010 | Westerhof et al. | 30/43.4 |
| 2011/0030220 | A1 * | 2/2011 | Shimizu | 30/43.6 |
| 2011/0308088 | A1 * | 12/2011 | Brada et al. | 30/43.6 |

FOREIGN PATENT DOCUMENTS

| | | | |
|---|---|---|---|
| DE | 9014307 | | 2/1991 |
| EP | 1313373 | | 5/2003 |
| EP | 1616676 | | 1/2006 |
| EP | 1616676 | A2 | 1/2006 |
| FR | 1192334 | | 10/1959 |
| GB | 776826 | | 6/1957 |
| GB | 776826 | A | 6/1957 |
| GB | 965791 | | 8/1964 |
| GB | 965791 | A | 8/1964 |
| GB | 1450888 | | 9/1976 |
| GB | 2266070 | | 10/1993 |
| WO | 2006067710 | | 6/2006 |
| WO | 2006067710 | A1 | 6/2006 |
| WO | 2006067713 | | 6/2006 |
| WO | 2006067721 | | 6/2006 |
| WO | 2008062339 | | 5/2008 |

OTHER PUBLICATIONS

European Patent Office, European Proceedings, Jul. 4, 2018, pp. 1-884, European Patent Office, Munich, Germany.

* cited by examiner

ROTARY SHAVER WITH IMPROVED SUPPORT STRUCTURE FOR SHAVING HEADS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*More than one reissue application has been filed for the reissue of U.S. Pat. No. 8,261,452. The reissue applications are application Ser. No. 14/664,083 (the present application) and Ser. No. 14/484,033. This present application is a continuation reissue of application Ser. No. 14/484,033, which is an application for reissue of U.S. Pat. No. 8,261, 452.*

FIELD OF THE INVENTION

The present invention relates to a shaving device comprising a shaving head, and in particular to a shaving device comprising a base structure and a head structure, wherein the head structure comprises a head support structure configured to hold at least one shaving head.

BACKGROUND OF THE INVENTION

A shaving device of the above-mentioned kind is known e.g. from U.S. Pat. No. 2,253,737 and GB 965,791. Both documents disclose a shaving device comprising a base structure which operates as a handling structure and comprises an actuator for actuating the shaving heads. Furthermore, the shaving devices comprise a head structure comprising at least one shaving head. The head structure and the base structure are releasably coupled such that the head structure may be removed from the base structure, e.g. for cleaning.

The above-mentioned known shaving devices are designed such that the head structure is configured for deliberate removal by a user. In case of an accidental fall, or the like, of the shaving device, the head structure stays substantially in position. In case of such an accident, a force on the head structure may result in damage to the shaving head and/or the head structure.

OBJECT OF THE INVENTION

It is an object of the invention to provide a shaving device of the kind mentioned in the opening paragraph, wherein the head structure and the shaving heads are protected against damage in case of an overloading force.

SUMMARY OF THE INVENTION

According to the invention the above mentioned object is achieved by a shaving device according to claim 1. A head structure of a shaving device according to the present invention further comprises a coupling element arranged in a central area of the head structure; and the base structure comprises a retaining structure configured for releasably retaining the coupling element for coupling the head structure to the base structure. Further, according to the present invention, the base structure is free of support elements in an area of an outer circumference of the head structure such that the head structure, when coupled to the base structure, is not supported in the area of its outer circumference and the head structure, when coupled to the base structure, is substantially only retained on the base structure by a retaining force provided by the retaining structure.

When an external load is exerted on the head structure of the shaving device according to the present invention, the load is transferred to the coupling element. Since in the coupled state the head structure is not supported in the area of its outer circumference, the area of the outer circumference cannot contribute in transferring the external load to the base structure. As a result, the coupling element has to transfer a substantial part of the external load. Since in addition the coupling element is arranged in the central area of the head structure, the mechanical torque associated with the external load will lead to a relatively high force on the coupling element. If the external load is large enough, the coupling element is released from the retaining structure, thereby preventing that an overload would result in damage to the shaving head or the head structure.

It is noted that in the above-described prior art shaving devices, the head structure is supported in the area of its outer circumference by the base structure. Therefore, when a load is exerted on the head structure, the area of the outer circumference of the head structure will contribute in transferring the load to the base structure, so that the force exerted on the coupling element is limited. Accordingly it is very unlikely that the head structure will be released from the base structure as a result of a high external load, so that the head structure and the base structure may be damaged if the load is large.

In normal use of the shaving device according to the invention, the coupling element and the retaining structure provide a solid coupling between the head structure and the base structure such that a force exerted on the shaving device during normal use does not result in release of the coupling element. Only if the load exceeds a critical value, for example due to an accidental misuse or fall, the coupling element is released from the base structure.

In an embodiment, the head structure is solely supported by the coupling element. Thus, there is no other supporting element between the head structure and the base structure. The head structure is enabled to move and transfer an external load to the coupling element and is thus enabled to enforce the release of the coupling element from the retaining structure.

In a further embodiment, the coupling element is a shaft-like element protruding from a central area of the head support structure. The shaft-like element comprises at its distal end a sloped surface facing the head support structure. The retaining structure comprises a retaining recess for receiving the coupling element and a spring element at least partly provided in the retaining recess. The spring element is arranged for engaging the sloped surface of the coupling element such that the coupling element is retainable in the retaining recess. The spring element clamps the coupling element by engaging the sloped surface. For releasing the coupling element, the spring element has to be forced to shift over the sloped surface by a large load, in particular a torque. If the load is sufficiently large, the spring element shifts off the sloped surface, thereby releasing the coupling element. In an embodiment, the sloped surface may be provided as a protrusion from the shaft-like element.

In another embodiment, the sloped surface may be provided in a coupling recess in the shaft-like element. In such an embodiment, the shaft-like element is substantially cylindrical. Advantageously, an inner diameter of the retaining recess and an outer diameter of the substantially cylindrical coupling element may be substantially equal. Thus, the tight fit of the substantially cylindrical coupling element and the retaining recess may counter a load (torque) exerted during use. Thus, the spring element and the tight fit co-operate in providing a solid attachment for use, while allowing release in case of a load above a critical value.

In an embodiment, a collar is provided around the shaft-like element for abutting an edge around the circumference of the retaining recess. The collar is arranged around the shaft-like element such that the collar may abut the base structure when the head structure is attached to the base structure. While the spring element is exerting a spring force on the sloped surface, the collar prevents a further insertion of the coupling element, thus generating a tension on the sloped surface for retaining the coupling element. Further, the collar may prevent dirt and dust from entering into the retaining recess and/or may provide a water-tight closure of the base structure. If the collar is not symmetrically designed, the collar may define an orientation of the head structure in relation to the base structure.

In an embodiment, a drive shaft for driving the shaving heads extends between the base structure and the head structure through the shaft-like element.

In an embodiment, the distal end of the shaft-like coupling element is at least partly beveled for forcing the spring element aside when inserting the coupling element in the retaining recess. When inserting the coupling element in the retaining recess, the spring element is forced aside in order to enable the coupling element to enter as far into the retaining recess as is required for the sloped surface facing the head support structure to engage with the spring element.

In an aspect, the present invention further provides a head structure according to claim 11 for use in a shaving device according to the present invention.

BRIEF DESCRIPTION OF THE DRAWINGS

Hereinafter, the present invention is elucidated with reference to non-limiting embodiments as illustrated in the appended drawings, in which.

DETAILED DESCRIPTION OF EXAMPLES

Figure 1:
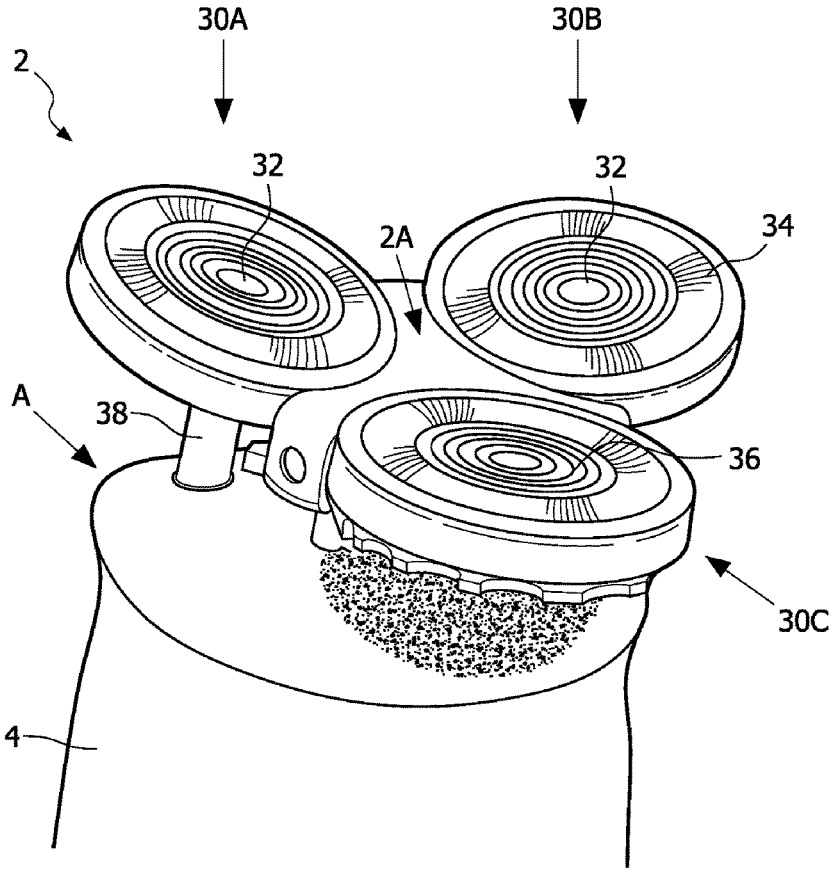
FIG. 1 shows a perspective view of a shaving device according to the present invention.

In the drawings, like reference numerals refer to like elements. In FIG. 1 a perspective view of a shaving device according to the present invention is shown. The shaving device comprises a head structure 2 and a base structure 4. The head structure 2 supports and retains three rotary shaving heads 30A, 30B, 30C. A space A between the head structure 2 and the base structure 4 is substantially open to the surroundings and substantially free from obstacles. Optionally, the open space A may be interrupted by one or more conduits 38 belonging to a shaving lotion supply system, as described in e.g. international application WO2006/067710 by the current applicant. The conduit 38 may run from a reservoir in the base structure 4 to an outlet nozzle 32 arranged in or near [the] *a radial center of* shaving [heads] *head* 30A, 30B and/or 30C *as shown in FIG. 1*. The shaving heads 30A, 30B, 30C comprise hair entry apertures 34 and a cover plate 36. A cutter means arranged below the hair entry apertures 34 is configured to be driven by a motor means arranged in the base structure 4 in order to rotate and cut a hair entering through the hair entry apertures 34.

Referring to FIGS. 2A-2D, in a first embodiment according to the present invention, the head structure 2 is releasably connectable to the base structure 4. The base structure 4 as shown is to be mounted on a handle structure of a device, such as a shaving device as shown in FIG. 1. As used herein, the base structure may be an element to be mounted on a handle structure, as shown in FIGS. 2A-2D, or the term 'base structure' may refer to a handle structure as a whole, as shown in FIG. 1.

It is noted that a similar assembly of a head structure and a base structure may be applied in similar devices, such as a trimming device, tooth brush device, a grooming device, and the like. Further, the construction of the assembly may as well be advantageously employed for using a number of different head structures, such as a trimming head structure, a shaving head structure, a grooming head structure, a tooth brush head structure, and the like, in combination with a single base structure.

In FIGS. 2A-2D, a part of a shaving device is illustrated. The head structure 2 of the shaving device has a central area 2A and comprises a head support structure 6 for supporting a shaving head, in particular a rotary shaving head (not shown). In the illustrated embodiment, three support structures 6 for supporting three rotary shaving heads are arranged around the central area 2A. The head structure 2 further comprises a coupling element 8. The coupling element 8 is, in the illustrated embodiment, a shaft-like element. The coupling element 8 comprises a protrusion 12 at its distal end. The protrusion 12 comprises a sloped surface 12A facing the head support structure 6. The opposite side of the protrusion, coinciding with the distal end of the coupling element 8, is also beveled.

The coupling element 8 further comprises a collar 14. The collar 14 is configured to abut the base structure 4 at an edge around a retaining recess 18 in which the coupling element 8 is to be inserted. The retaining recess 18 in the base structure 4 is a part of a retaining structure. The retaining structure of the embodiment as illustrated in FIGS. 2A-2D further comprises a first spring element 10A and a second spring element 10B. The spring elements 10A and 10B are arranged such that the spring elements 10A and 10B are engagable with the sloped surface 12A of the protrusion 12, for clamping the coupling element 8 in the retaining recess 18 of the base structure 4. The spring elements 10A and 10B thus pull the coupling element 8 inwards into the retaining recess 18 by applying a spring force on the sloped surface 12A. The collar 14, however, blocks further insertion of the coupling element 8. Thus, the coupling element 8 is solidly retained in the retaining recess, thereby providing a solid coupling of the head structure 2 and the base structure 4. The coupling between the head structure 2 and the base structure 4 is sufficient to allow normal use of the device without the head structure 2 being uncoupled from the base structure.

In accordance with the present invention, the head structure 2 is releasable from the base structure 4, if a relatively large load, i.e. force or torque, is applied to the head structure 2, e.g. due to an accidental misuse or fall of the device. For this reason, the base structure 4 is free of any supporting elements in an area of an outer circumference of the head structure 2, such that the head structure 2 is not supported in the area of its outer circumference. Moreover, in the illustrated embodiment, the head structure 2 is solely retained and supported by the coupling element 8. To this end, the head structure 2 and the base structure 4 are configured in such a way that a space restricted at one side by the head structure 2 and at its opposite side by the base structure 4 is substantially open at its remaining, surrounding side.

The coupling element 8 protrudes from the central area 2A. When a relatively large load is applied to a part of the head structure 2, the load is transferred through the central area 2A to the coupling element 8, resulting in a torque on the distal end of the coupling element 8. The resulting torque is transferred to the sloped surface 12A of the protrusion 12 at the distal end of the coupling element 8. The spring element 10A or 10B engaged with the sloped surface 12A is forced aside, thereby shifting over the sloped surface 12A. If the load is sufficiently large, the spring element 10A or 10B is shifted off the sloped surface 12A and the protrusion 12 is enabled to move past the spring element 10A or 10B, thereby releasing the coupling element 8 and the head structure 2 from the base structure 4.

In the above-described first embodiment, the retaining recess 18 has an inner diameter which is larger than an outer diameter of the protrusion 12 at the distal end of the coupling element 8. Consequently, when inserted, the coupling element 8 is not supported against an inner wall of the retaining recess 18, as the outer diameter of the coupling element 8 is smaller than the outer diameter of the protrusion 12.

Figure 3:
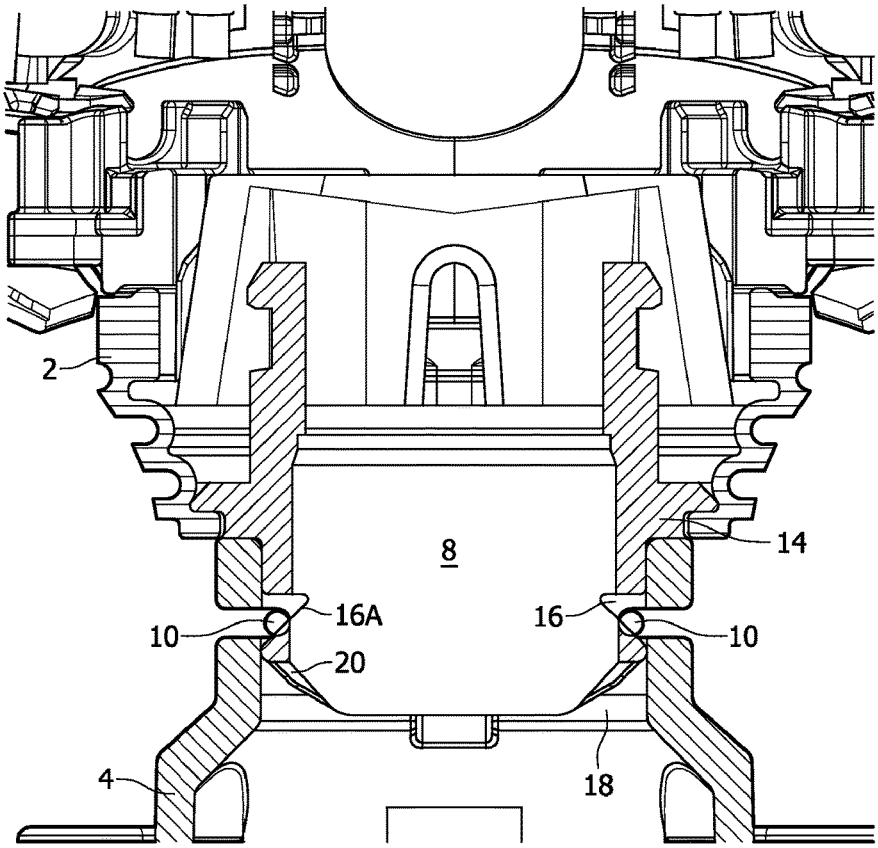
FIG. 3 shows a sectional view of a coupling element and a retaining structure of a second embodiment of a shaving device according to the present invention.

In a second embodiment, as illustrated in FIGS. 3-5B, the outer diameter of the coupling element 8 is substantially equal to the inner diameter of the retaining recess. Referring to FIG. 3, a head structure 2 comprises a coupling element 8 provided with a coupling recess 16 having a sloped surface 16A. The distal end 20 of the coupling element 8 is beveled.

As illustrated, the coupling element 8 is inserted in a retaining recess 18 of a base structure 4. A spring element 10 engages the sloped surface 16A, thereby clamping and retaining the coupling element 8 in the retaining recess 18. A collar 14 prevents that the coupling element 8 is further inserted into the retaining recess 18.

Figure 4A:
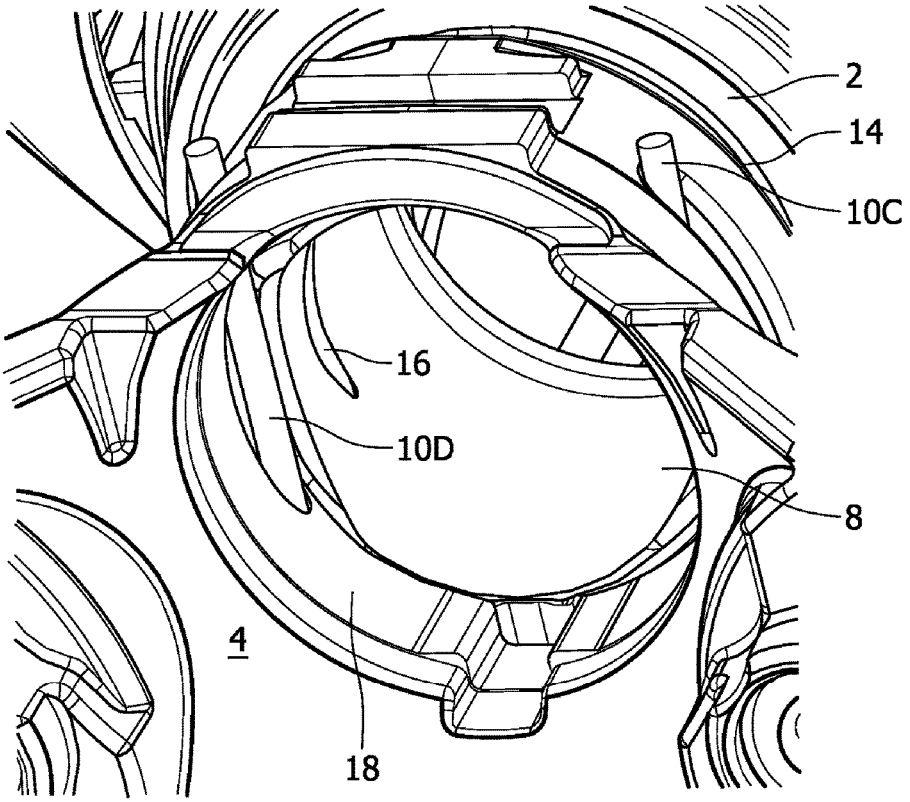
FIG. 4A shows a view of the coupling element and the retaining structure of the second embodiment as seen from the retaining recess.
Figure 4B:
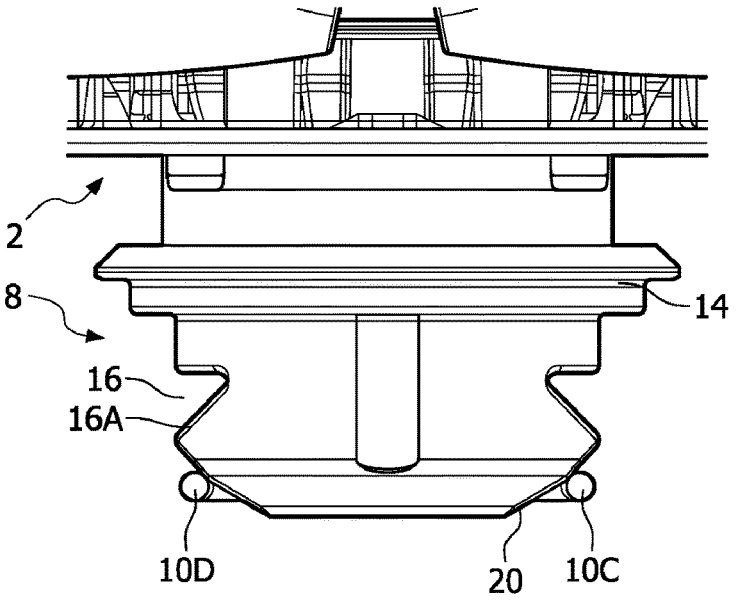
FIGS. 4B-4C show a perspective view of the coupling element according to the second embodiment.
Figure 4C:
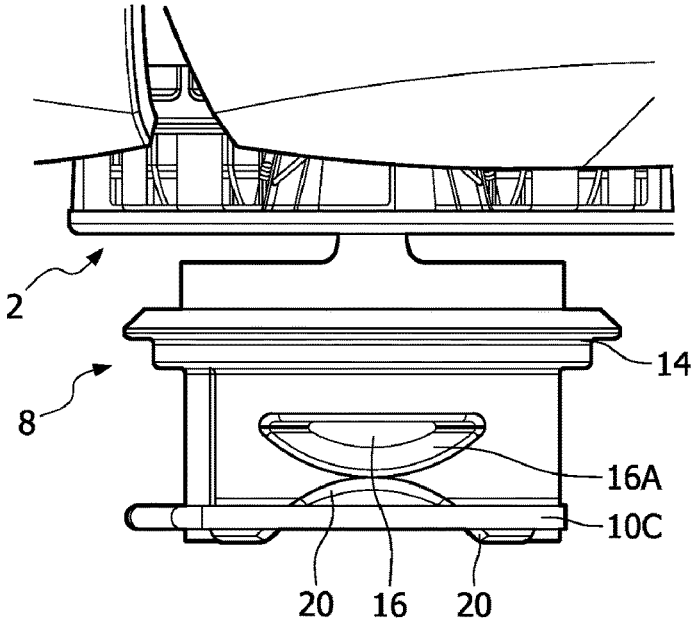

FIGS. 4A-4C illustrate an insertion of the coupling element 8 into the retaining recess 18. As the spring element 10 is to engage the sloped surface 16A of the coupling recess 16 in the coupling element 8, a distance between a first arm 10C and a second arm 10D of the spring element 10 has to be smaller than an outer diameter of the coupling element 8. When inserting the coupling element 8, the arms 10C, 10D of the spring element 10 need to be forced aside in order to insert the coupling element 8 as far as required for engaging the sloped surface 16A with the spring arms 10C, 10D.

The substantially cylindrical coupling element 8 has a beveled distal end 20, as shown in FIG. 4B. The beveled end 20 forces the spring arms 10C, 10D aside, thereby increasing the distance between the spring arms 10C, 10D. As illustrated in FIG. 4C, if the walls of the coupling element 8 are not sufficiently thick, the wall may be partly removed in order to provide sufficient bevel.

Figure 5A:
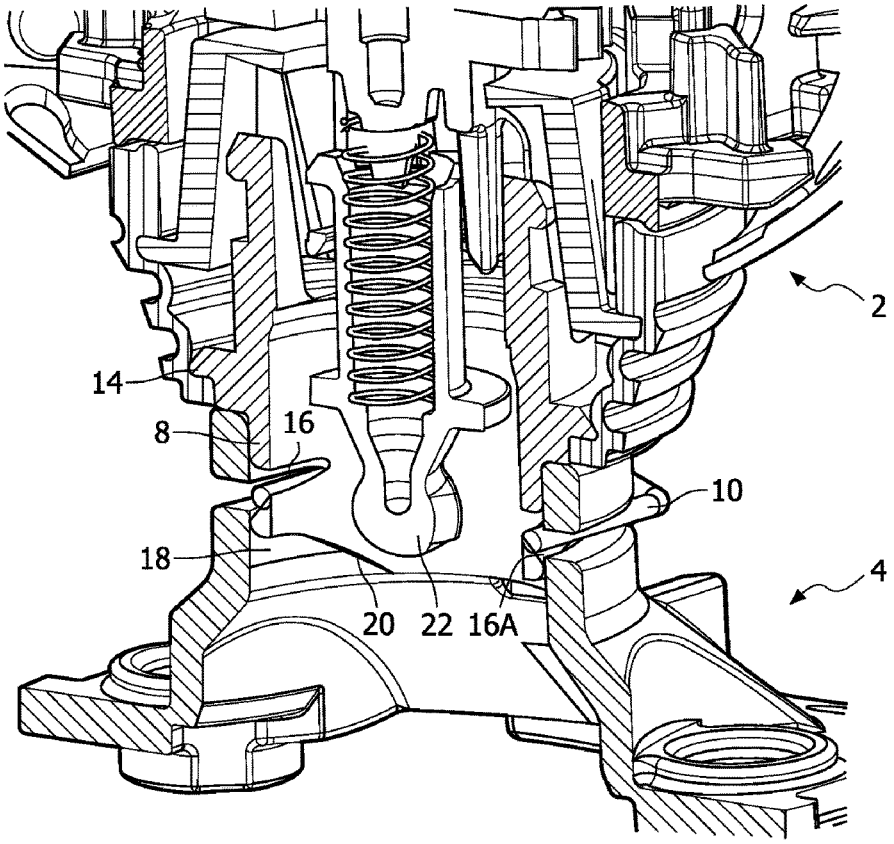
FIG. 5A shows a sectional perspective view of the second embodiment of the present invention.

Referring to FIG. 5A, a drive shaft 22 for driving the shaving heads arranged in the head structure 2 may extend through the shaft-like coupling element 8. Such an arrangement of the drive shaft 22 may also be employed in the first embodiment as illustrated in FIGS. 2A-2C.

Figure 5B:
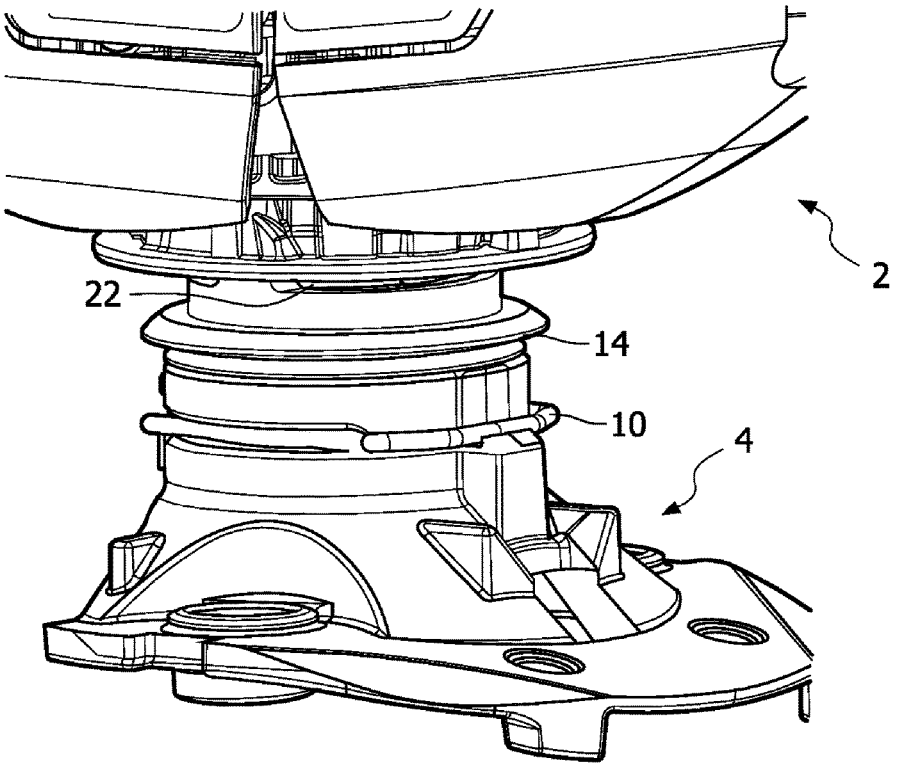
FIG. 5B shows a further perspective view of the retaining structure and the head structure according to the second embodiment of the present invention.

Referring to FIGS. 5A and 5B, the spring element 10, comprising a first spring arm and a second spring arm (10C and 10D, respectively, as shown in FIG. 4A-4C), is arranged at an outer circumference of the retaining recess 18. The retaining recess 18 is provided with slits extending through the wall of the retaining recess 18. The spring element 10, in particular its arms, are positioned in the slits, thereby being partly arranged in the retaining recess 18 for engaging the sloped surface 16A in order to retain the coupling element 8.

Figure 2A:
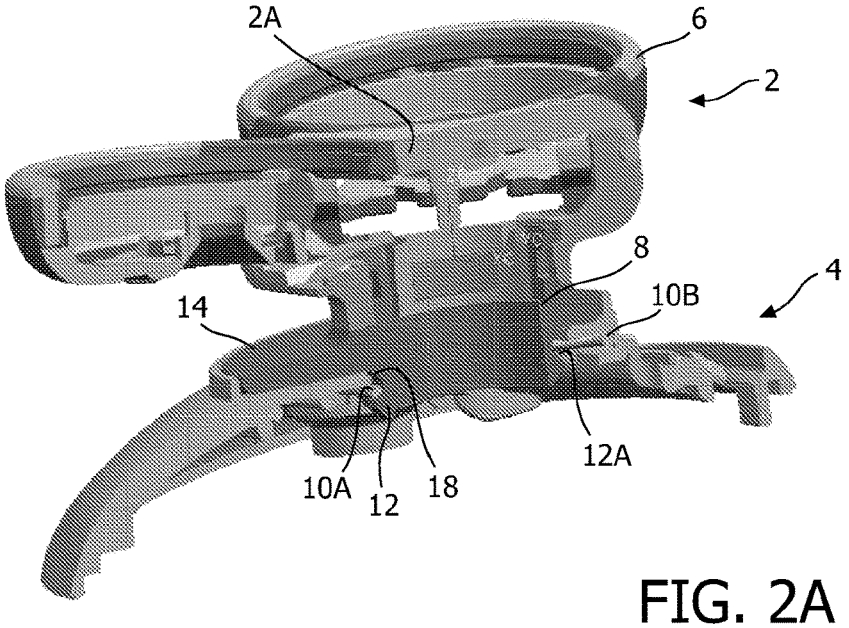
FIG. 2A shows a sectional perspective view of a part of a first embodiment of a shaving device according to the present invention.
Figure 2B:
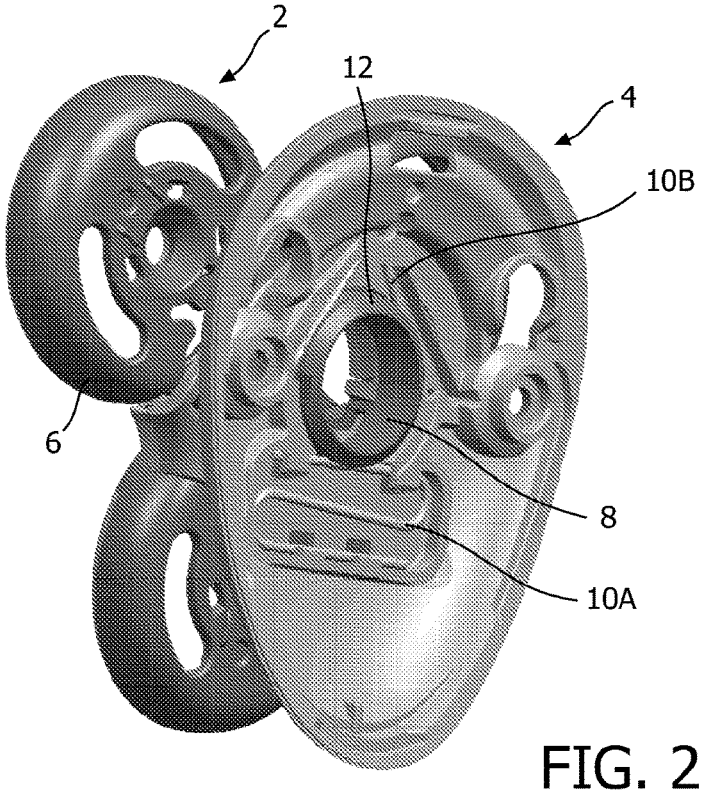
FIGS. 2B-2C show a perspective view of the part of the first embodiment shown in FIG. 2A.
Figure 2C:
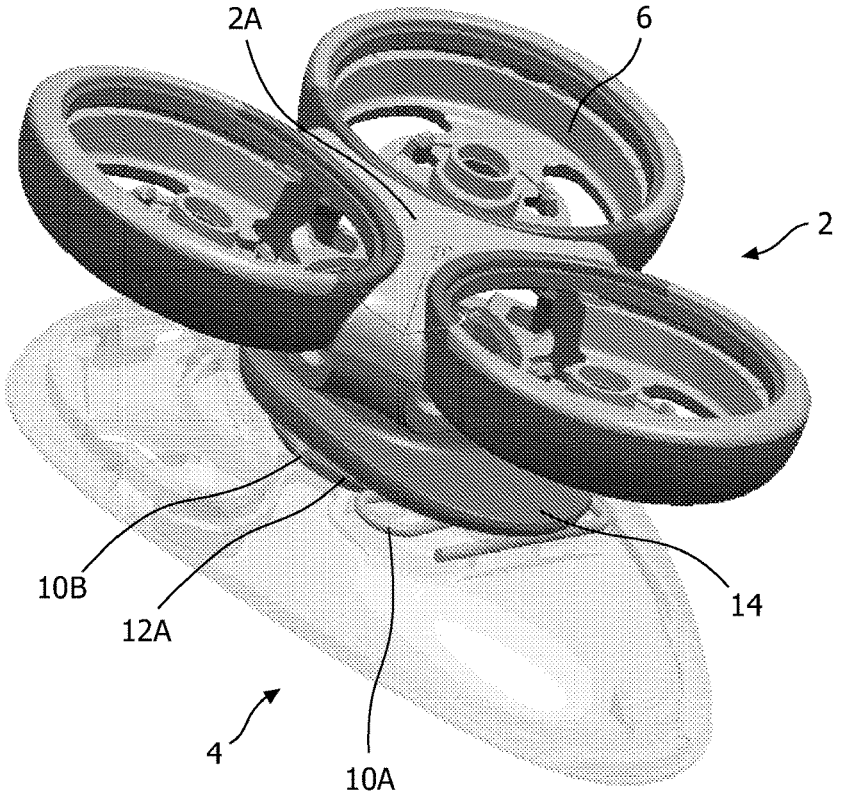
Figure 2D:
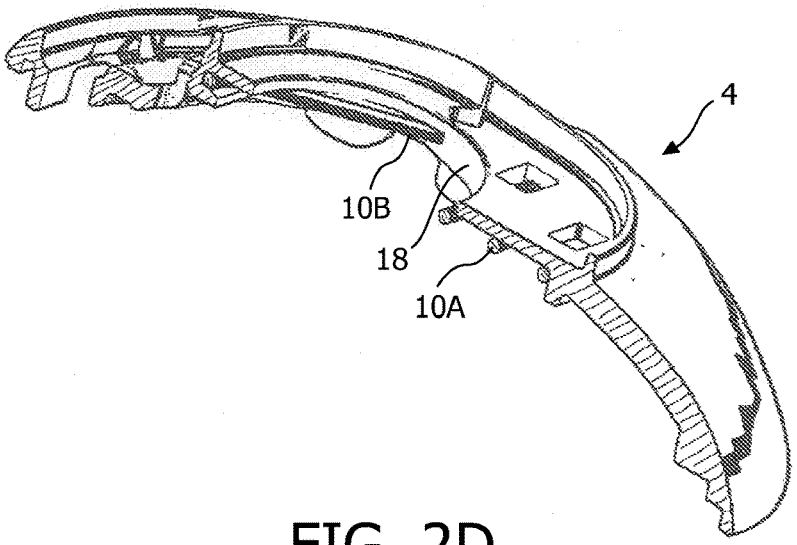
FIG. 2D shows a partly sectional perspective view of a base structure of the first embodiment shown in FIGS. 2A-2C.

In operation, the second embodiment as illustrated in FIGS. 3-5B functions substantially similarly to the first embodiment as illustrated in FIGS. 2A-2C. Compared to the first embodiment, the tight fit of the coupling element 8 and the retaining recess 18 assists the spring element 10 in retaining the coupling element 8. A torque or other load exerted on the head structure 2 and transferred to the coupling element 8 is countered by the spring force of the spring element 10 and by the disability of the coupling element 8 to tilt in the retaining recess 18. Thus, a threshold or critical value of a force or torque is determined by the spring force and the disability to tilt. Therefore, a load applied during normal use may be large.

Although detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variably employ the present invention in virtually any appropriately detailed structure. Further, the mere fact that certain measures are recited in mutually different dependent claims does not indicate that a combination of these measures cannot be used to advantage.

Further, the terms and phrases used herein are not intended to be limiting, but rather to provide an understandable description of the invention. The terms "a" or "an", as used herein, are defined as one or more than one. The term another, as used herein, is defined as at least a second or more. The terms including and/or having, as used herein, are defined as comprising (i.e., open language). The term coupled, as used herein, is defined as connected, although not necessarily directly.

The invention claimed is:

[1. A shaving device comprising a base structure and a head structure, wherein the head structure comprises:

a head support structure configured to hold at least one shaving head;

a coupling element arranged in a central area of the head structure; and wherein the base structure comprises:

a retaining structure configured for releasably retaining the coupling element for coupling the head structure to the base structure; and the base structure being free of support elements in an area of an outer circumference of the head structure such that the head structure, when coupled to the base structure, is not supported in the area of its outer circumference, and the head structure, when coupled to the base structure, being substantially only retained on the base structure by a retaining force exerted by the retaining structure on the coupling element, wherein the coupling element is a shaft-like element protruding from the central area of the head structure and comprising, at a distal end thereof, a sloped surface facing the head support structure, wherein the retaining structure comprises a retaining recess for receiving the coupling element; and a spring element at least partly provided in the retaining recess, the spring element being arranged for engaging the sloped surface of the coupling element such that the coupling element is retainable in the retaining recess, and wherein the sloped surface protrudes from the shaft-like coupling element.]

[2. The shaving device as claimed in claim 1, wherein the head structure, when coupled to the base structure, is solely supported by the coupling element.]

[3. The shaving device as claimed in claim 1, wherein a drive shaft for driving the at least one shaving head extends between the base structure and the head structure through the coupling element.]

[4. The shaving device as claimed in claim 1, wherein the head support structure is configured to support at least two rotary shaving heads, the coupling element being arranged in a center of a substantially circular area, the substantially circular area being restricted by a rotary shaft of each rotary shaving head.]

[5. A head structure for use in the shaving device as claimed in claim 1, the head structure comprising:

a head support structure configured to hold at least one shaving head;

a coupling element arranged in a central area of the head structure;

wherein the head structure, when coupled to the base structure, is retainable on the base structure substantially only by a retaining force provided by the coupling element.]

[6. A shaving device comprising a base structure and a head structure, wherein the head structure comprises:

a head support structure configured to hold at least one shaving head;

a coupling element arranged in a central area of the head structure; and wherein the base structure comprises:

a retaining structure configured for releasably retaining the coupling element for coupling the head structure to the base structure; and the base structure being free of support elements in an area of an outer circumference of the head structure such that the head structure, when coupled to the base structure, is not supported in the area of its outer circumference, and the head structure, when coupled to the base structure, being substantially only retained on the base structure by a retaining force exerted by the retaining structure on the coupling element, wherein the coupling element is a shaft-like element protruding from the central area of the head structure and comprising, at a distal end thereof, a sloped surface facing the head support structure, wherein the retaining structure comprises a retaining recess for receiving the coupling element; and a spring element at least partly provided in the retaining recess, the spring element being arranged for engaging the sloped surface of the coupling element such that the coupling element is retainable in the retaining recess, and wherein a collar is provided around the coupling element for abutting on an edge around the circumference of the retaining recess.]

[7. The shaving device as claimed in claim 6, wherein the coupling element is substantially cylindrical and the sloped surface is provided in a coupling recess in the coupling element.]

[8. The shaving device as claimed in claim 7, wherein an inner diameter of the retaining recess and an outer diameter of the substantially cylindrical coupling element are substantially equal.]

[9. The shaving device as claimed in claim 6, wherein the distal end of the coupling element is at least partly beveled for forcing the spring element aside when the coupling element is being inserted in the retaining recess.]

[10. The shaving device as claimed in claim 6, wherein a drive shaft for driving the at least one shaving head extends between the base structure and the head structure through the coupling element.]

[11. The shaving device as claimed in claim 6, wherein the head support structure is configured to support at least two rotary shaving heads, the coupling element being arranged in a center of a substantially circular area, the substantially circular area being restricted by a rotary shaft of each rotary shaving head.]

[12. A head structure for use in the shaving device as claimed in claim 6, the head structure comprising:

a head support structure configured to hold at least one shaving head;

a coupling element arranged in a central area of the head structure;

wherein the head structure, when coupled to the base structure, is retainable on the base structure substantially only by a retaining force provided by the coupling element.]

*13. A shaving device comprising:*

*a head structure that includes a head support structure to hold at least two rotary shaving heads and a coupling element arranged in a center of a substantially circular area, the substantially circular area being bounded by a radial center of each rotary shaving head, wherein the coupling element protrudes from the substantially circular area of the head structure and comprises, at a distal end thereof, a protrusion with a sloped surface; and*

*a base structure that includes a retaining structure configured for releasably retaining the coupling element in a retaining recess to couple the head structure to the base structure, the base structure being free of support elements in an area of an outer circumference of the head structure such that the head structure, when coupled to the base structure, is not supported in the area of its outer circumference, and the head structure, when coupled to the base structure, is substantially retained on the base structure by a retaining force exerted between the retaining structure and the coupling element; and*

*a spring element being arranged to engage the protrusion of the coupling element such that the coupling element is retainable in the retaining recess.*

*14. The shaving device of claim 13, wherein the head structure, when coupled to the base structure, is solely supported by the coupling element.*

*15. The shaving device of claim 13, wherein a drive shaft for driving the at least one shaving head extends between the base structure and the head structure through the coupling element.*

*16. The shaving device of claim 13, wherein the at least two rotary shaving heads comprise three rotary shaving heads.*

*17. A shaving device comprising:*

*a head structure that includes a head support structure configured to hold at least two rotary shaving heads, and a shaft-like coupling element arranged in a center of a substantially circular area, the substantially circular area being bounded by a radial center of each rotary shaving head, the coupling element protruding from the substantially circular area of the head structure and including, at a distal end thereof, a protrusion with a sloped surface; and*

*a base structure that includes a retaining structure configured for releasably retaining the coupling element in a retaining recess to couple the head structure to the base structure, the base structure being free of support elements in an area of an outer circumference of the head structure such that the head structure, when coupled to the base structure, is not supported in the area of its outer circumference, and the head structure, when coupled to the base structure, is substantially retained on the base structure by a retaining force exerted on the coupling element; and*

*a spring element being arranged for engaging the protrusion of the coupling element such that the coupling element is retainable in the retaining recess; and*

*a collar is provided around the coupling element for abutting on an edge around a circumference of the retaining recess.*

*18. The shaving device of claim 17, wherein the head structure, when coupled to the base structure, is solely supported by the coupling element.*

*19. The shaving device of claim 17, wherein a drive shaft for driving the at least one shaving head extends between the base structure and the head structure through the coupling element.*

*20. The shaving device of claim 17, wherein the at least two rotary shaving heads comprise three rotary shaving heads.*

* * * * *